(12) United States Patent
Kawamura et al.

(10) Patent No.: US 11,095,173 B2
(45) Date of Patent: Aug. 17, 2021

(54) STATOR FOR ROTATING ELECTRIC MACHINE, AND ROTATING ELECTRIC MACHINE

(71) Applicant: MITSUBISHI ELECTRIC CORPORATION, Tokyo (JP)

(72) Inventors: Koji Kawamura, Tokyo (JP); Akira Hashimoto, Tokyo (JP); Hiroyuki Akita, Tokyo (JP); Sachiko Kawasaki, Tokyo (JP); Naohiro Motoishi, Tokyo (JP); Takatoshi Masuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 452 days.

(21) Appl. No.: 16/072,663

(22) PCT Filed: Feb. 22, 2017

(86) PCT No.: PCT/JP2017/006587
§ 371 (c)(1),
(2) Date: Jul. 25, 2018

(87) PCT Pub. No.: WO2017/154576
PCT Pub. Date: Sep. 14, 2017

(65) Prior Publication Data
US 2019/0036390 A1 Jan. 31, 2019

(30) Foreign Application Priority Data
Mar. 9, 2016 (JP) .............................. JP2016-045234

(51) Int. Cl.
*H02K 21/16* (2006.01)
*H02K 1/16* (2006.01)
(Continued)

(52) U.S. Cl.
CPC .............. *H02K 1/165* (2013.01); *H02K 1/148* (2013.01); *H02K 1/278* (2013.01); *H02K 15/024* (2013.01);
(Continued)

(58) Field of Classification Search
CPC ...... H02K 1/165; H02K 1/278; H02K 15/024; H02K 1/148; H02K 21/16
(Continued)

(56) References Cited

U.S. PATENT DOCUMENTS

2006/0214533 A1* 9/2006 Miyashita .............. H02K 29/03
310/216.004
2011/0127876 A1* 6/2011 Hasuo .................... H02K 1/146
310/216.004

FOREIGN PATENT DOCUMENTS

JP 2006288042 A 10/2006
WO WO-2016178368 A1 * 11/2016 ........... H02K 15/024

OTHER PUBLICATIONS

International Search Report (PCT/ISA/210) dated May 16, 2017, by the Japanese Patent Office as the International Searching Authority for International Application No. PCT/JP2017/006587.
(Continued)

*Primary Examiner* — Terrance L Kenerly
(74) *Attorney, Agent, or Firm* — Buchanan Ingersoll & Rooney PC

(57) ABSTRACT

A stator core of a rotary electric machine includes: an outer core that is an annular back yoke portion; and an inner core in which a plurality of teeth are radially arranged and inner side end portions of the teeth adjacent to each other in a circumferential direction are connected to each other in the circumferential direction by connection portions and which is fitted to an inner side of the outer core, each connection portion has a hole penetrating in an axial direction, each
(Continued)

connection portion is split into a plurality of sections by the hole, a width in a radial direction of the one connection portion at a portion of the connection portion that has a smallest width in the radial direction is equal to or greater than ¼ and less than ½ of a sheet thickness of each of sheets.

9 Claims, 11 Drawing Sheets

(51) Int. Cl.
    *H02K 1/14*     (2006.01)
    *H02K 1/27*     (2006.01)
    *H02K 15/02*     (2006.01)
    *H02K 29/03*     (2006.01)

(52) U.S. Cl.
    CPC ............ *H02K 21/16* (2013.01); *H02K 29/03* (2013.01); *H02K 2213/03* (2013.01)

(58) Field of Classification Search
    USPC .................................................. 310/216.009
    See application file for complete search history.

(56) References Cited

OTHER PUBLICATIONS

Written Opinion (PCT/ISA/237) dated May 16, 2017, by the Japanese Patent Office as the International Searching Authority for International Application No. PCT/JP2017/006587.

\* cited by examiner

<STEP 1>
INSERT ONE SIDE
OF EACH COIL INTO
INNER CORE

<STEP 2>
INSERT OTHER END
OF EACH COIL INTO
INNER CORE

<STEP 3>
FIT OUTER
CORE FROM
AXIAL DIRECTION

STATOR FOR ROTATING ELECTRIC MACHINE, AND ROTATING ELECTRIC MACHINE

TECHNICAL FIELD

The present invention relates to a stator for a rotary electric machine and a rotary electric machine.

BACKGROUND ART

Hitherto, a method has been used in which, for a rotary electric machine in which a rotor is disposed at the inner peripheral side of a substantially cylindrical stator with a predetermined air gap therebetween, a stator core is divided into two sections, an inner core including teeth and an outer core that is a back yoke, a stator winding is installed into the inner core, and then the outer core is fitted thereto to integrate the stator core, which has been divided into two sections, thereby forming the stator.

For such a rotary electric machine, winding can be performed, from the outer peripheral side, on the inner core including tooth portions, of the stator core divided into two sections. Thus, a wide work space can be taken at the time of winding as compared to a method in which winding is performed from the inner peripheral side of the stator core, so that the winding work becomes easy. As a result, high-density winding is enabled, and thus performance improvement or size reduction of the rotary electric machine can be achieved.

Specifically, each slot has a shape spreading from the inner periphery toward the outer periphery, and when installing a coil into each slot, the coil is pressed toward the narrow portion at the inner peripheral side with the wide portion at the outer peripheral side as an entrance. Thus, in a state where the coil is pressed to a predetermined position within the slot, it is possible to minimize the gap between the coil and the core and the gap between the coil and another coil. Accordingly, by increasing the cross-sectional area of the coil disposed in each slot to increase a space factor, which is the ratio of the coil cross-sectional area to the slot area, the resistance value of the stator winding can be decreased, so that loss reduction and performance improvement of the rotary electric machine can be achieved. This is an advantageous effect achieved with each of a distributed winding type and a concentrated winding type as long as the core is structured to be divided into two sections, that is, an inner and an outer section.

Since the inner core is integrated without being divided into sections for the respective teeth, there is also an advantageous effect that the number of parts decreases and thus assembling the stator becomes easy. Furthermore, since the stator inner peripheral side opposing the rotor is connected in advance, errors in shape such as variations in pitch between the teeth are unlikely to occur, and the accuracy of the shape of the inner side of the assembled stator becomes good, so that there is also an advantageous effect that rotation unevenness or vibration is unlikely to occur during drive of the rotary electric machine.

Originally, a magnetic flux passing via the interior of each tooth generates driving force of the rotary electric machine by flowing via the air gap between the stator and the rotor to the rotor. However, since inner end portions of the adjacent teeth are connected to each other in the circumferential direction, magnetic flux leakage between the adjacent teeth via the connection portion cannot be avoided. The magnetic flux leakage passes via only the interior of the stator, and thus does not contribute to drive of the rotor at all. Therefore, the magnetic flux leakage becomes one of the factors for a decrease in characteristics of the rotary electric machine. Even though performance improvement is achieved by increasing the density of the winding as described above, performance deterioration occurs due to the magnetic flux leakage between the teeth.

Under such circumstances, a divided-type stator core has been proposed in which end portions of teeth are connected, and each connection portion is provided with a recess that decreases the width in the radial direction of the connection portion, in order to reduce a leakage magnetic flux at the connection portion (see, for example, Patent Document 1). When each connection portion is provided with a recess, the magnetic resistance at this portion increases, and thus there is an advantageous effect that a leakage magnetic flux passing via the connection portion is reduced.

CITATION LIST

Patent Document

Patent Document 1: Japanese Laid-Open Patent Publication No. 2006-288042

SUMMARY OF THE INVENTION

Problems to be Solved by the Invention

In the invention disclosed in Patent Document 1, since each connection portion is provided with a recess, there is a problem in that the mechanical strength of the connection portion decreases, and thus this portion deforms, for example, when the inner core is handled, resulting in deterioration of the accuracy of the shape of the inner side of the assembled stator core. In addition, since the strength of the connection portion decreases, there is a problem in that the natural frequency of the assembled stator core decreases, so that vibration and noise are easily generated in the rotary electric machine.

The present invention has been made to solve the above-described problems, and an object of the present invention is to provide a stator for a rotary electric machine and a rotary electric machine that can reduce a magnetic flux leaking between teeth via a connection portion and that have high rigidity, so that low noise and less vibration can be achieved during operation.

Solution to the Problems

A stator for a rotary electric machine according to the present invention is a stator for a rotary electric machine, the stator including: a stator core formed by stacking magnetic sheets; and a stator winding wound on teeth of the stator core, wherein the stator core includes
an outer core that is an annular back yoke portion, and
an inner core in which a plurality of the teeth are radially arranged and inner side end portions of the teeth adjacent to each other in a circumferential direction are connected to each other in the circumferential direction by connection portions and which is fitted to an inner side of the outer core,
each connection portion has a hole penetrating in an axial direction,
each connection portion is split into a plurality of sections by the hole, and a width in a radial direction of one connection portion at a portion of the connection portion that has a smallest width in the radial direction is equal to or greater than ¼ and less than ½ of a sheet thickness of each of the sheets.

A rotary electric machine according to the present invention includes:

the above stator for a rotary electric machine; and
a rotor rotatably held so as to oppose an inner peripheral surface of the stator.

Effect of the Invention

In the stator for a rotary electric machine and the rotary electric machine according to the present invention, by providing a hole in each connection portion between the teeth, and splitting each connection portion into the outer side connection portion and the inner side connection portion, the cross-sectional area of the core at the connection portion can be decreased. Accordingly, the magnetic resistance at this portion increases, and the effect of reducing a leakage magnetic flux between the teeth adjacent to each other in the circumferential direction is achieved, so that the electromagnetic characteristics of the rotary electric machine can be improved. In addition, by increasing residual stress in the outer side connection portion and the inner side connection portion, a magnetic flux flowing between the adjacent teeth via the connection portion can be further reduced, and thus a stator for a rotary electric machine and a rotary electric machine that have high efficiency can be provided.

Moreover, by providing a hole in each connection portion and forming each connection portion with a frame structure in which at least two beams (the outer side connection portion, the inner side connection portion) are rigidly joined, the rigidity of the stator core against deformation within a stacking plane can be improved. Accordingly, the effect is achieved that the stator core becomes unlikely to deform, and, in addition, the natural frequency of the stator core improves, so that vibration and noise of the rotary electric machine become unlikely to occur.

DESCRIPTION OF EMBODIMENTS

Embodiment 1

Hereinafter, a stator for a rotary electric machine and a rotary electric machine according to Embodiment 1 of the present invention will be described with reference to the drawings. In this description, unless otherwise particularly mentioned, the terms "axial direction", "circumferential direction", "radial direction", "inner peripheral side", "outer peripheral side", "inner side", and "outer side" refer to the "axial direction", "circumferential direction", "radial direction", "inner peripheral side", "outer peripheral side", "inner side", and "outer side" of a stator, respectively.

Figure 1:
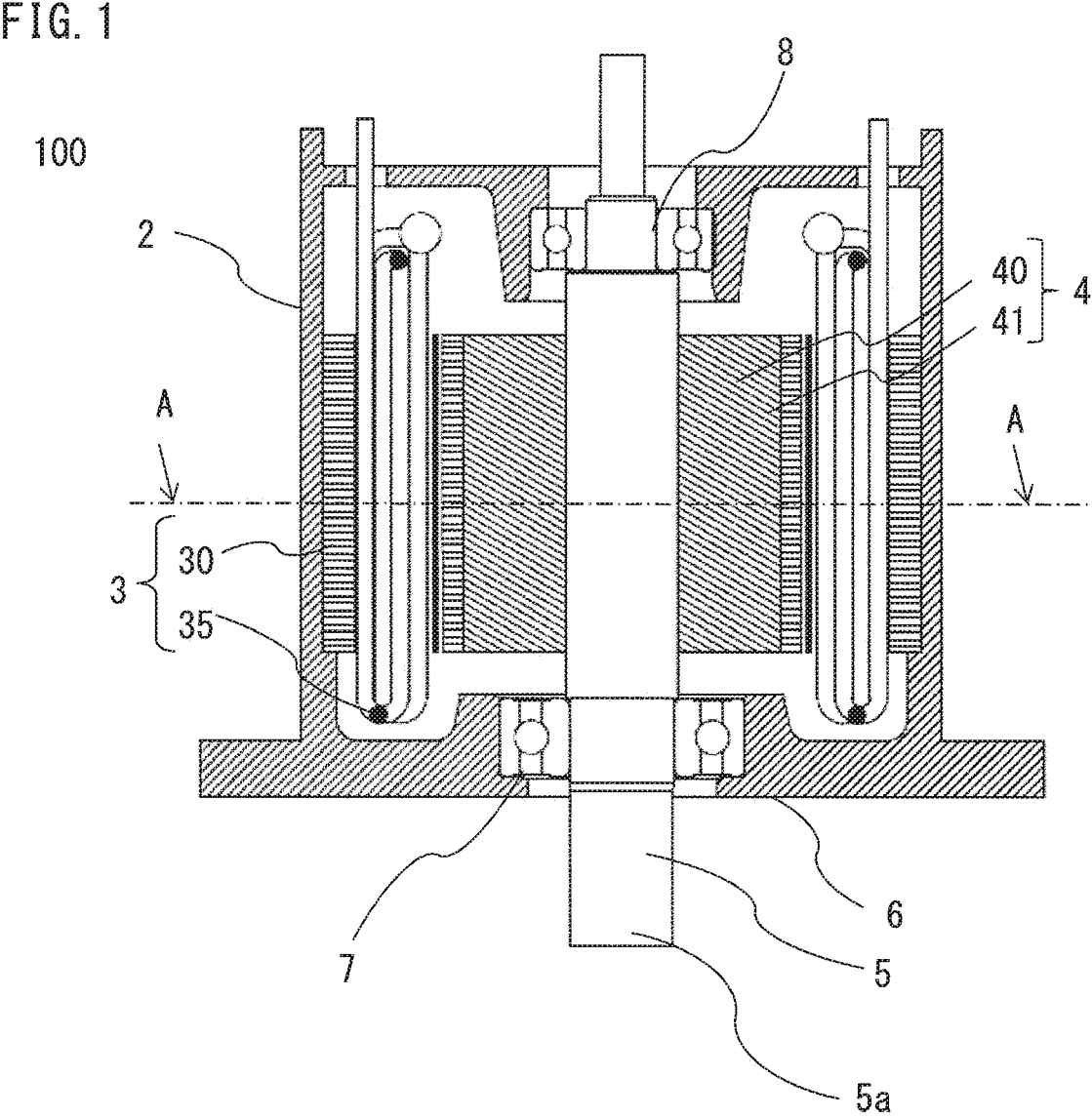
FIG. 1 is a schematic cross-sectional view of a rotary electric machine according to Embodiment 1 of the present invention.

FIG. 1 is a schematic cross-sectional view of a rotary electric machine 100.

The rotary electric machine 100 is a brushless motor, has three or more phases, and includes a frame 2, a stator 3, a rotor 4, a rotation shaft 5, a bearing holder 6, a bearing 7, and a bearing 8. In the rotary electric machine 100, an output end side 5a of the rotation shaft 5 is referred to as front side, and the side opposite thereto is referred to as rear side.

Figure 2:
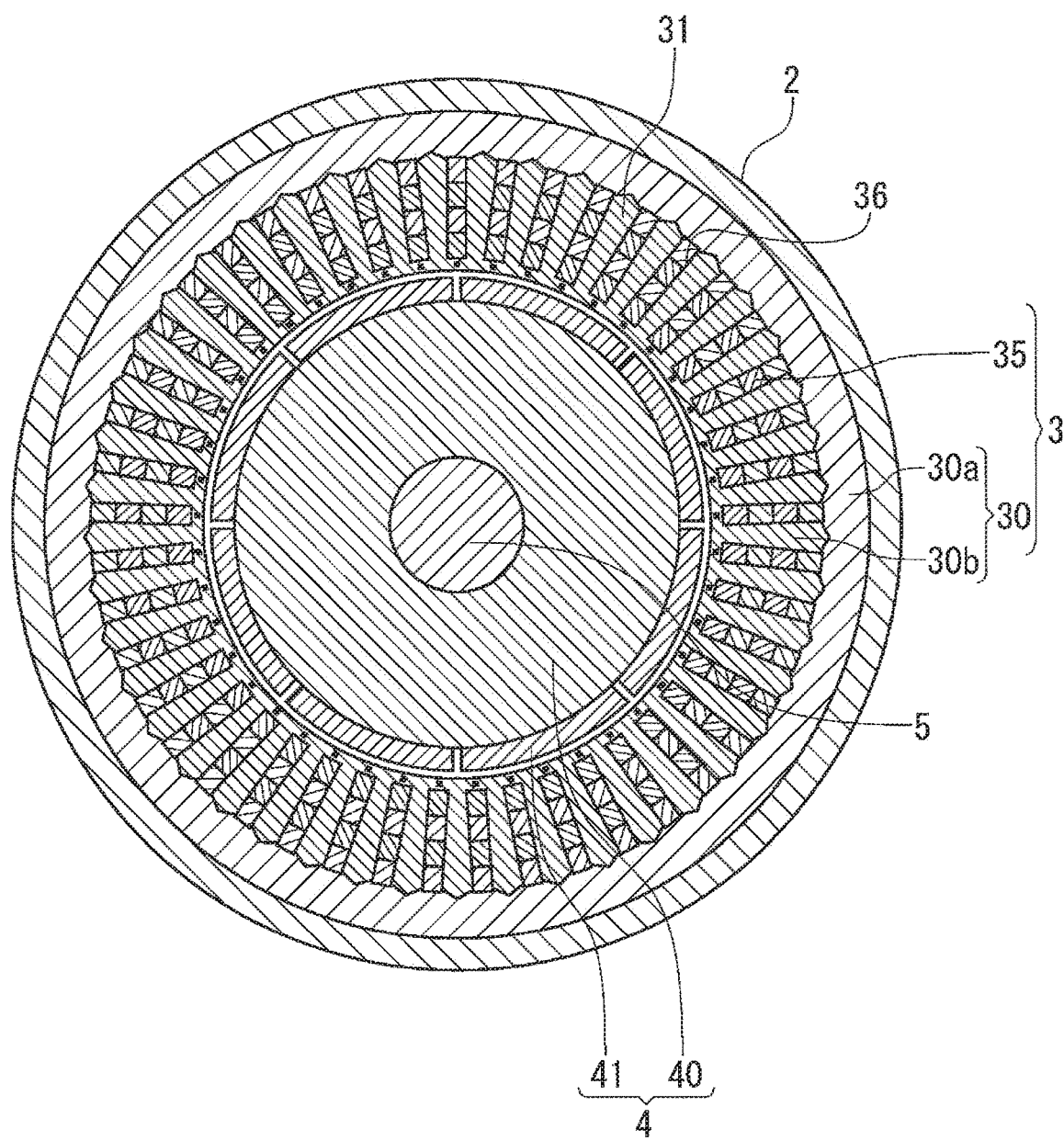
FIG. 2 is a cross-sectional view taken along a line A-A in FIG. 1.

FIG. 2 is a cross-sectional view taken along a line A-A in FIG. 1.

The rotary electric machine 100 controls the rotation speed and torque of the rotor 4 to desired values by switching a current flowing to a winding of each phase of the stator 3, so as to match with the phase of the rotor 4, using an inverter circuit that is not shown. For this, a rotation angle sensor for detecting the phase of the rotor 4 is provided at a rear side end portion of the rotation shaft 5, but is not shown in FIG. 1.

In the rotor 4, permanent magnets 41 that are field magnets of the rotary electric machine 100 are attached to the outer peripheral surface of a substantially cylindrical rotor core 40 that is formed from a ferromagnetic material such as iron, and the rotation shaft 5 is fixed at the center of the rotor core 40. In the present embodiment, a description will be given with a surface magnet type rotor 4 in which the permanent magnets 41 are attached to the surface of the rotor core 40. However, a magnet-embedded type rotor may be used in which holes for embedding magnets are provided within a rotor core and the magnets are embedded within the rotor core.

The stator 3 is an armature of the rotary electric machine 100, is disposed at the outer peripheral side of the rotor 4 with a certain air gap therebetween, and includes a stator core 30 and a stator winding 35. The stator core 30 includes: an outer core 30a that is an annular back yoke portion formed by stacking, in the axial direction of the rotary electric machine, a plurality of sheets that are electromagnetic steel sheets or steel sheets having a substantially circular shape and provided with a thin insulating coating on the surface thereof; and an inner core 30b formed by stacking sheets in each of which inner side end portions of a plurality of radially arranged teeth 31 are connected to each other in the circumferential direction.

Figures 3A, 3B:
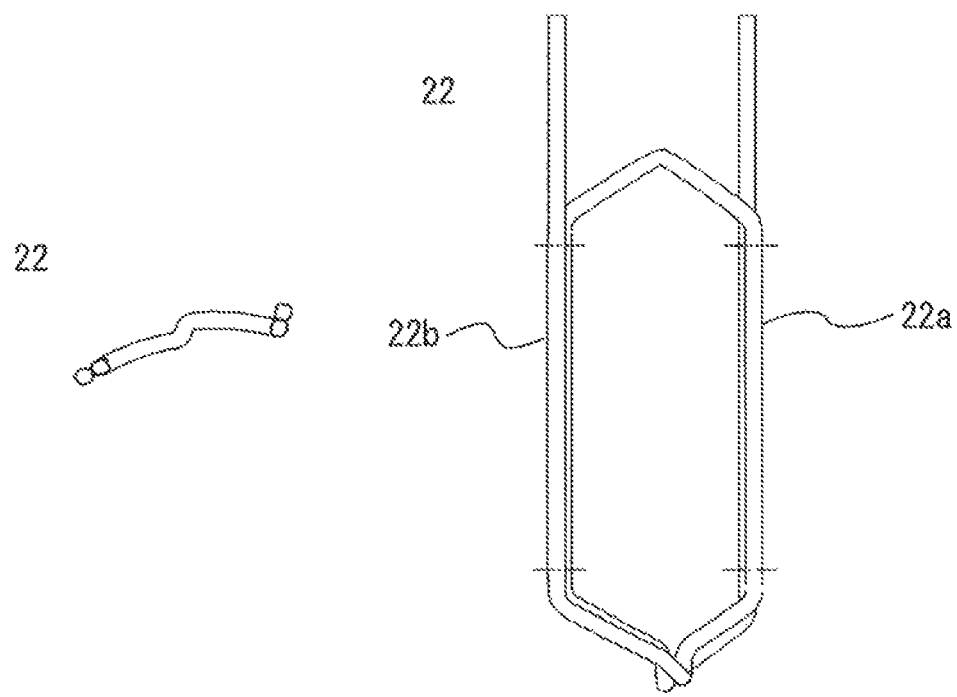
FIG. 3A shows a front view of a coil according to Embodiment 1 of the present invention.
FIG. 3B shows a side view of a coil according to Embodiment 1 of the present invention.

FIG. 3A is a front view of a hexagonal type coil 22 that is a minimum unit for forming the stator winding 35.

FIG. 3B is a side view of the coil 22.

The stator winding 35 is inserted into slots 36 that are gaps formed between the respective teeth 31 of the inner core 30b, and is formed by connecting a plurality of coils 22 each of which is wound twice over a plurality of the teeth 31. The stator winding may employ a form in which wave winding is achieved along the circumferential direction, or the number of turns of each coil 22 may be increased or decreased.

Each coil 22 is composed of a wire that is formed from a metallic material having a high electrical conductivity such as copper and aluminum, and the surface thereof is covered with an insulating resin coating. Portions of the coil 22 that are disposed within the slots 36 are slot accommodation portions 22a and 22b. Portions of the coil 22 that protrude outward in the axial direction from the slots 36 of the stator core 30 are coil end portions, and each coil end portion is extended to the coil 22 disposed in other slots or is joined as a terminal end.

The stator winding 35 includes windings of three or more phases, and each phase is composed of a plurality of the coils 22. That is, the stator winding 35 of one phase is formed by joining a plurality of the coils 22 in series, in parallel, or in series and in parallel.

Next, a method for assembling the stator winding 35 to the stator core 30, which is divided into two sections, the outer core 30a and the inner core 30b, by using the hexagonal type coils 22 will be described.

Figure 4A:
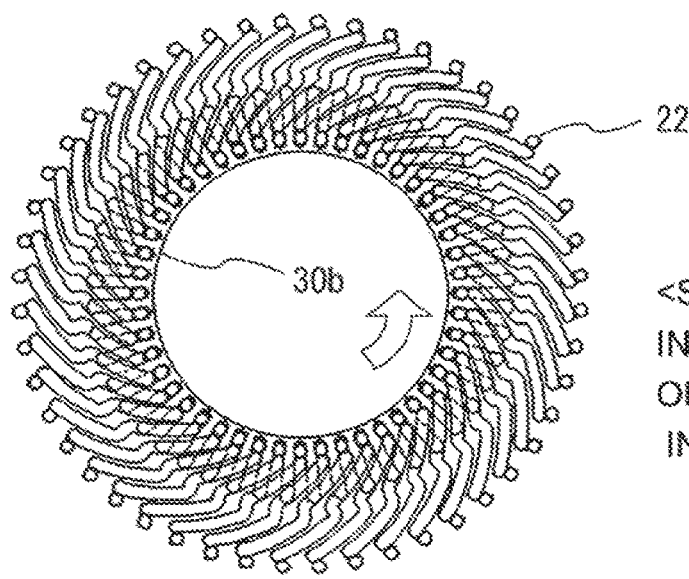
FIG. 4A shows a process for producing a stator winding according to Embodiment 1 of the present invention.
Figure 4B:
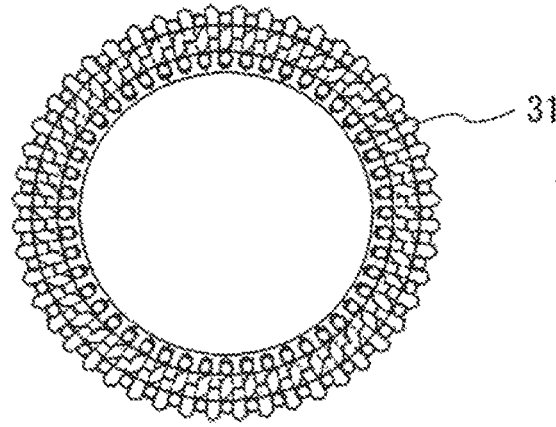
FIG. 4B shows a process for producing a stator winding according to Embodiment 1 of the present invention.
Figure 4C:
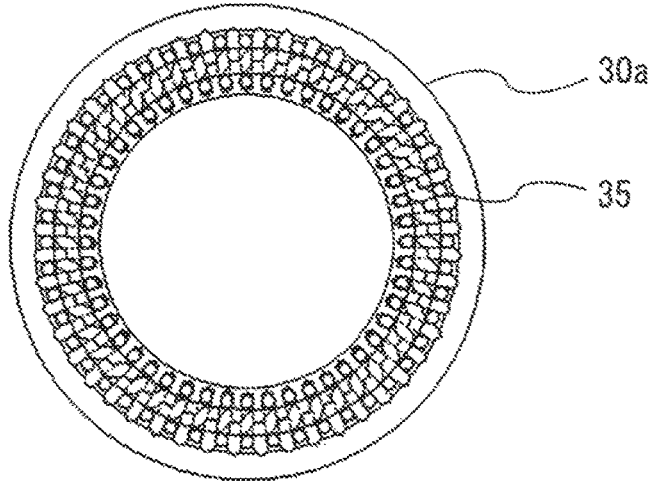
FIG. 4C shows a process for producing a stator winding according to Embodiment 1 of the present invention.

FIGS. 4A to 4C are diagrams showing a process for producing the stator winding 35.

As shown in FIG. 2, the stator core 30 is divided into the outer core 30a and the inner core 30b at the outermost peripheral portions of the teeth 31. In the inner core 30b, the inner peripheral side ends of the respective teeth 31 are connected to each other in the circumferential direction, and the slots 36, which are present between the teeth 31 and in which the coils 22 are disposed, are formed in a shape opened at the outer peripheral side.

Here, first, when the opened outer peripheral side of each slot 36 of the inner core 30b is defined as an entrance of each slot 36, and the connected inner peripheral side thereof is defined as a bottom of each slot 36, the slot accommodation portions 22a (pairs of two slot accommodation portions) of all the coils 22 are inserted into the slots 36 through the entrances of the respective slots 36 as shown in FIG. 4A. Next, the inner core 30b is rotated in the direction of an arrow in FIG. 4A, and the other slot accommodation portions 22b (pairs of two slot accommodation portions) are inserted into the other slots 36 over a plurality of the teeth 31 as shown in FIG. 4B.

Then, the outer core 30a is press-fitted and fixed to the outer periphery of the inner core 30b in the axial direction as shown in FIG. 4C.

Figure 5:
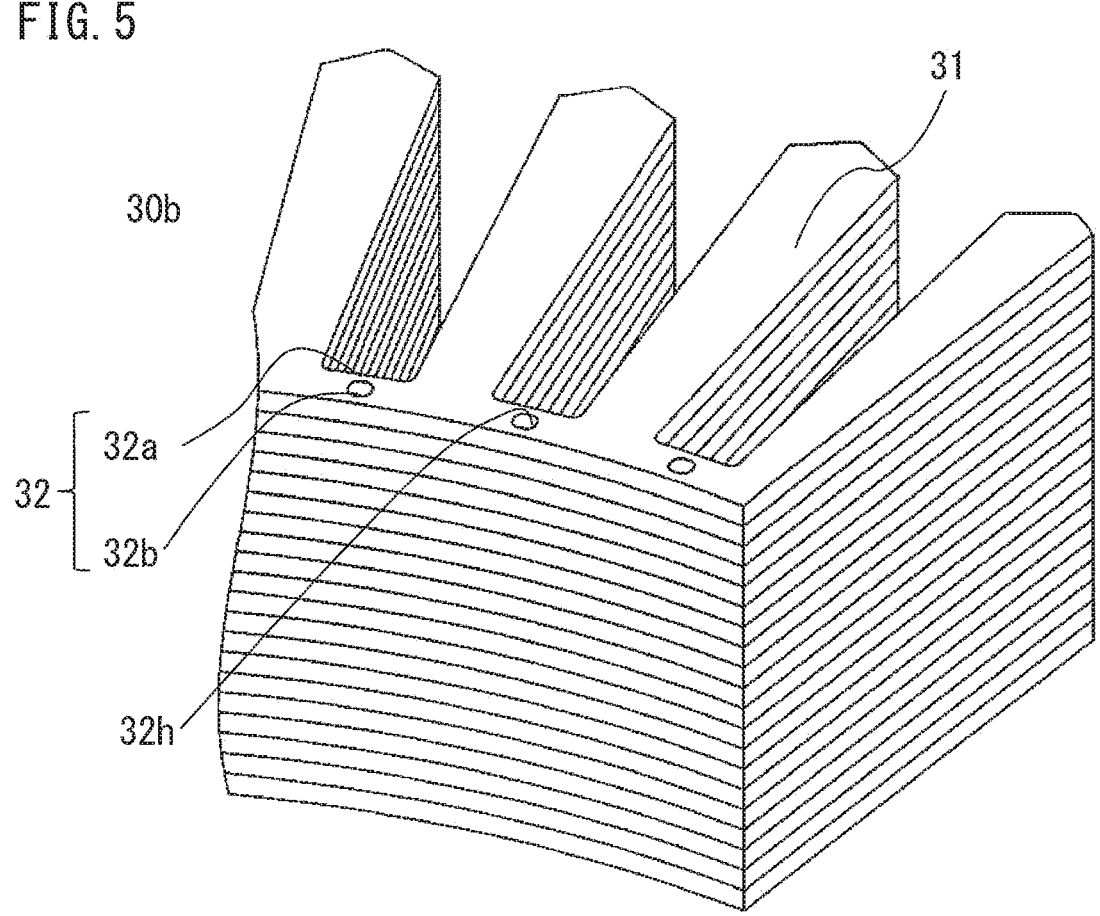
FIG. 5 is an enlarged perspective view of a main part of an inner core according to Embodiment 1 of the present invention.
Figure 6:
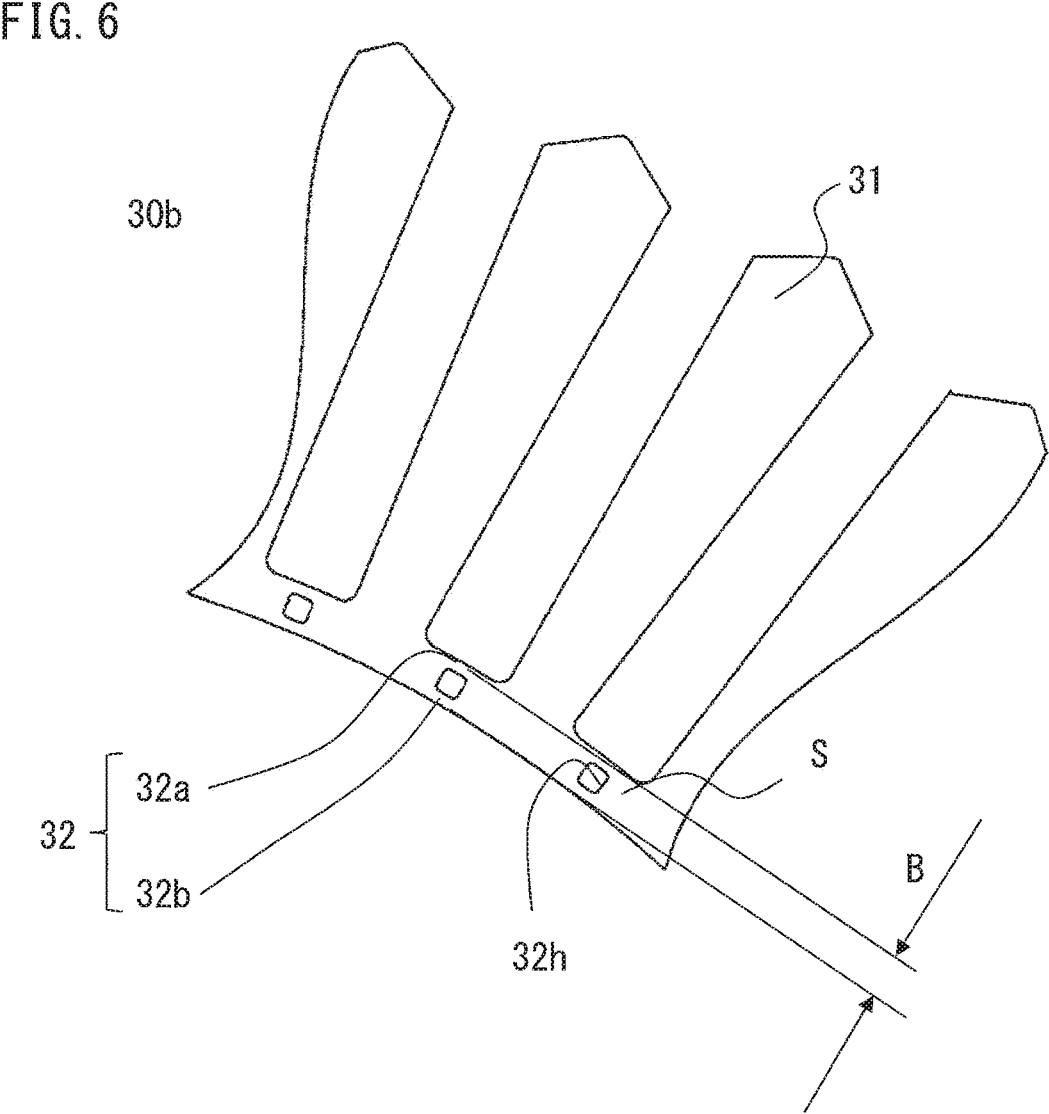
FIG. 6 is an enlarged front view of a main part of the inner core according to Embodiment 1 of the present invention.

FIG. 5 is an enlarged perspective view of a main part of the inner core 30b. Specifically, FIG. 5 is an enlarged view of a cut part of the inner core 30b. FIG. 6 is an enlarged front view of a main part of the inner core 30b.

In the inner core 30b, at the inner side end portions of the respective teeth 31, the adjacent teeth 31 are connected to each other in the circumferential direction by connection portions 32. Each connection portion 32 is provided with a hole 32h penetrating in the axial direction. At a portion in which the hole 32h is provided, the connection portion 32 is split into two sections, an outer side connection portion 32a at the radially outer side and an inner side connection portion 32b at the radially inner side.

In the present embodiment, the widths in the radial direction of the outer side connection portion 32a and the inner side connection portion 32b are equal to each other, but the widths and the shapes thereof do not necessarily need to be the same and may be different. In addition, in FIG. 6, one hole 32h is provided in each connection portion 32, so that the connection portion 32 is split into two sections, the outer side connection portion 32a and the inner side connection portion 32b. However, for example, two elongated holes may be aligned in the radial direction in each connection portion 32, and three connection portions may be provided.

Figure 7:
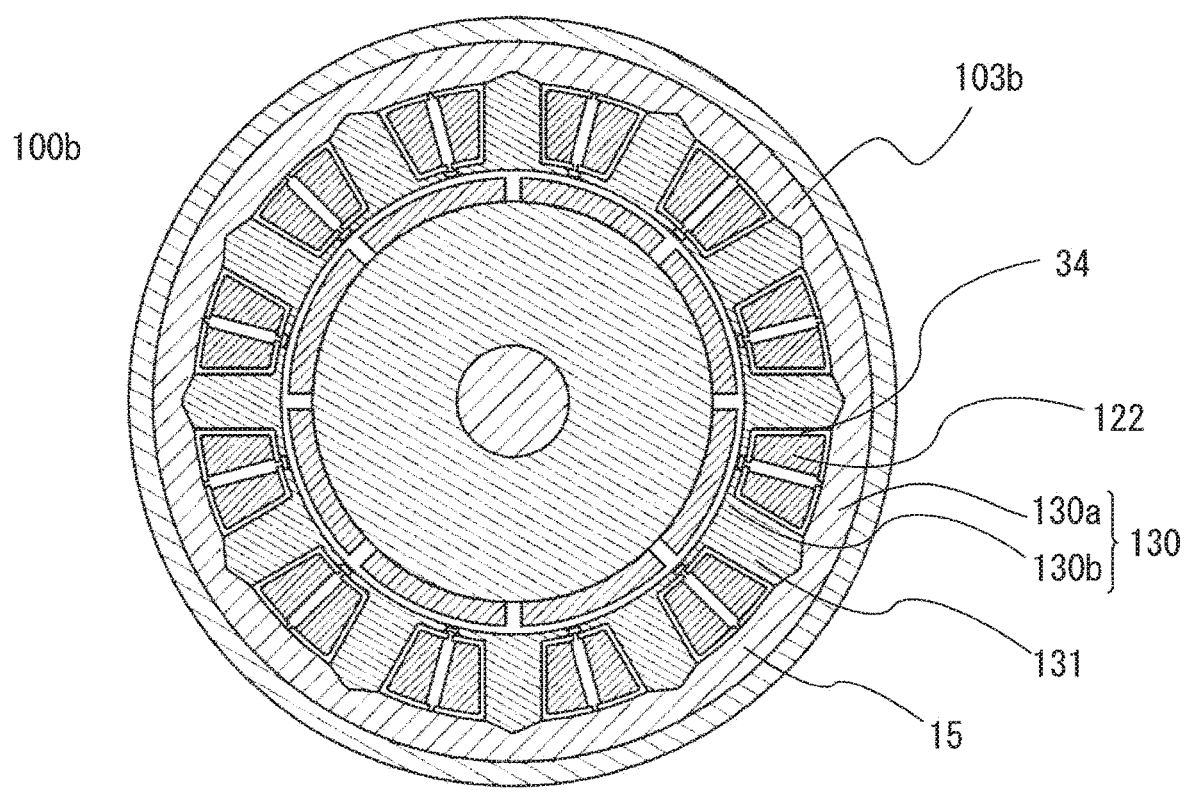
FIG. 7 is a cross-sectional view, perpendicular to a rotation shaft, of another rotary electric machine according to Embodiment 1 of the present invention.

FIG. 7 is a cross-sectional view, perpendicular to a rotation shaft, of a rotary electric machine 100b in the case where a concentrated winding type is used.

The rotary electric machine 100 of a distributed winding type in which each coil 22 is disposed over a plurality of the teeth 31 has been described above. However, a stator core 130 that is divided into an inner side section and an outer side section is similarly applicable to the rotary electric machine 100b of a concentrated winding type in which each coil 122 is not disposed over a plurality of teeth 131 but is wound on only one tooth 131, and the present invention is also similarly applicable to the rotary electric machine 100b.

The coils 122 wound on winding frames 34 that are formed from an insulating material such as resin are fitted to the respective teeth 131 of an inner core 130b from the outer peripheral side. Thereafter, similar to the case of the above-described distributed winding type, an outer core 130a is fitted to the outer periphery of the inner core 130b to form a stator 103b.

In the stator 3 of the rotary electric machine 100 and the rotary electric machine 100 according to Embodiment 1 of the present invention, by providing the hole 32h in each connection portion 32 between the teeth 31, and splitting the connection portion 32 into the outer side connection portion 32a and the inner side connection portion 32b, the cross-sectional area of the core at the connection portion 32 can be decreased. Accordingly, the magnetic resistance at this portion increases, and the effect of reducing a leakage magnetic flux between the teeth 31 adjacent to each other in the circumferential direction is achieved, so that the electromagnetic characteristics of the rotary electric machine 100 can be improved.

By providing the hole 32h in each connection portion 32, the connection portion 32 is formed with a frame structure in which at least two beams (the outer side connection portion 32a, the inner side connection portion 32b) are rigidly joined. When the sum of the cross-sectional areas of the beams connecting the teeth 31 is the same, second moment of area with respect to deformation within a stacking plane is greater with a frame structure using a plurality of beams than using one beam. As a result, the rigidity of the stator core 30 against deformation within the stacking plane increases, and thus the effect is achieved that the stator core 30 becomes unlikely to deform, and, in addition, the natural frequency of the stator core 30 improves, so that vibration and noise of the rotary electric machine 100 become unlikely to occur.

Since the stator core 30 is formed by stacking a large number of sheets that are electromagnetic steel sheets or steel sheets that are made of a ferromagnetic material, the strength against deformation in the stacking direction is sufficiently high as compared to the strength against deformation within the stacking plane, so that there is no problem in deformation in the stacking direction.

Meanwhile, when each connection portion 32 is configured to be split into two or more sections, the width in the radial direction of the connection portion 32 is increased by the width of the hole 32h as compared to the case where each connection portion 32 is composed of only one portion. However, when the width B in the radial direction of the entire connection portion 32 including the hole 32h is equal to or smaller than the width in the radial direction of a shoe portion S at the end of the tooth 31 as shown in FIG. 6, the area in which winding is possible, of the cross-sectional area, perpendicular to the axial direction, of the slot 36 does not decrease, so that a stator winding having the same structure as a conventional structure can be disposed.

The example in which the connection portion 32 between the adjacent teeth 31 is split into two sections, the outer side connection portion 32a and the inner side connection portion 32b, has been described above, but the connection portion 32 may be split into three or more sections. In addition, the hole 32h does not necessarily need to be located at the center between the adjacent teeth 31, and may be located at a position closer to either tooth 31.

Embodiment 2

Hereinafter, a stator for a rotary electric machine and a rotary electric machine according to Embodiment 2 of the present invention will be described with reference to the drawing, focusing on the differences from Embodiment 1.

Figure 8:
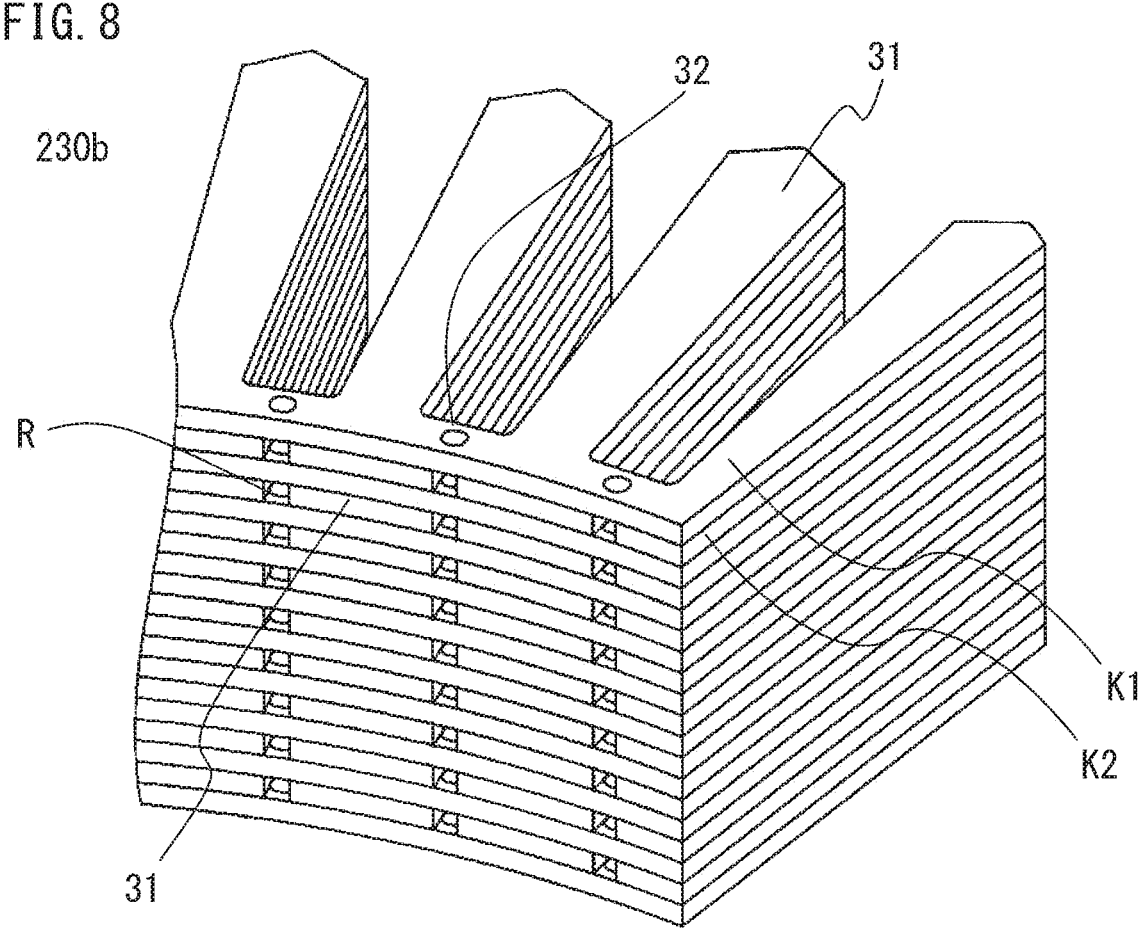
FIG. 8 is an enlarged perspective view of a main part of an inner core according to Embodiment 2 of the present invention.

FIG. 8 is an enlarged perspective view of a main part of an inner core 230b.

In Embodiment 1, by providing the hole 32h in the connection portion 32 between the adjacent teeth 31, the connection portion 32 is configured to be split into the outer side connection portion 32a and the inner side connection portion 32b, so that a leakage magnetic flux is reduced and also the rigidity of the stator core 30 is increased. In the inner core 230b of the present embodiment, steel sheets K1 including a plurality of connection portions 32 and steel sheets K2 in which adjacent teeth 31 are not connected are alternately stacked. An air gap R is provided between the teeth 31 of the steel sheets K2 adjacent to each other in the circumferential direction.

Although not shown, the steel sheets K1 and K2 are connected to each other in the stacking direction at the teeth 31 by a means such as swaging, welding, or bonding.

In the stator for a rotary electric machine and the rotary electric machine according to Embodiment 2 of the present invention, even when the inner side end portions of the adjacent steel sheets K2 are not connected to each other, desired strength of the inner core 230b is ensured due to the frame structure with the outer side connection portion 32a and the inner side connection portion 32b in each steel sheet K1, so that there is no problem even when the number of steel sheets K1 is decreased.

In addition, since the air gap R is provided in the circumferential direction between the steel sheets K2 in which the teeth 31 adjacent to each other in the circumferential direction are not connected to each other, a magnetic flux does not leak, so that the electromagnetic characteristics of the rotary electric machine can be further improved.

Embodiment 3

Hereinafter, a stator for a rotary electric machine and a rotary electric machine according to Embodiment 3 of the present invention will be described with reference to the drawing, focusing on the differences from Embodiment 1.

Figure 9:
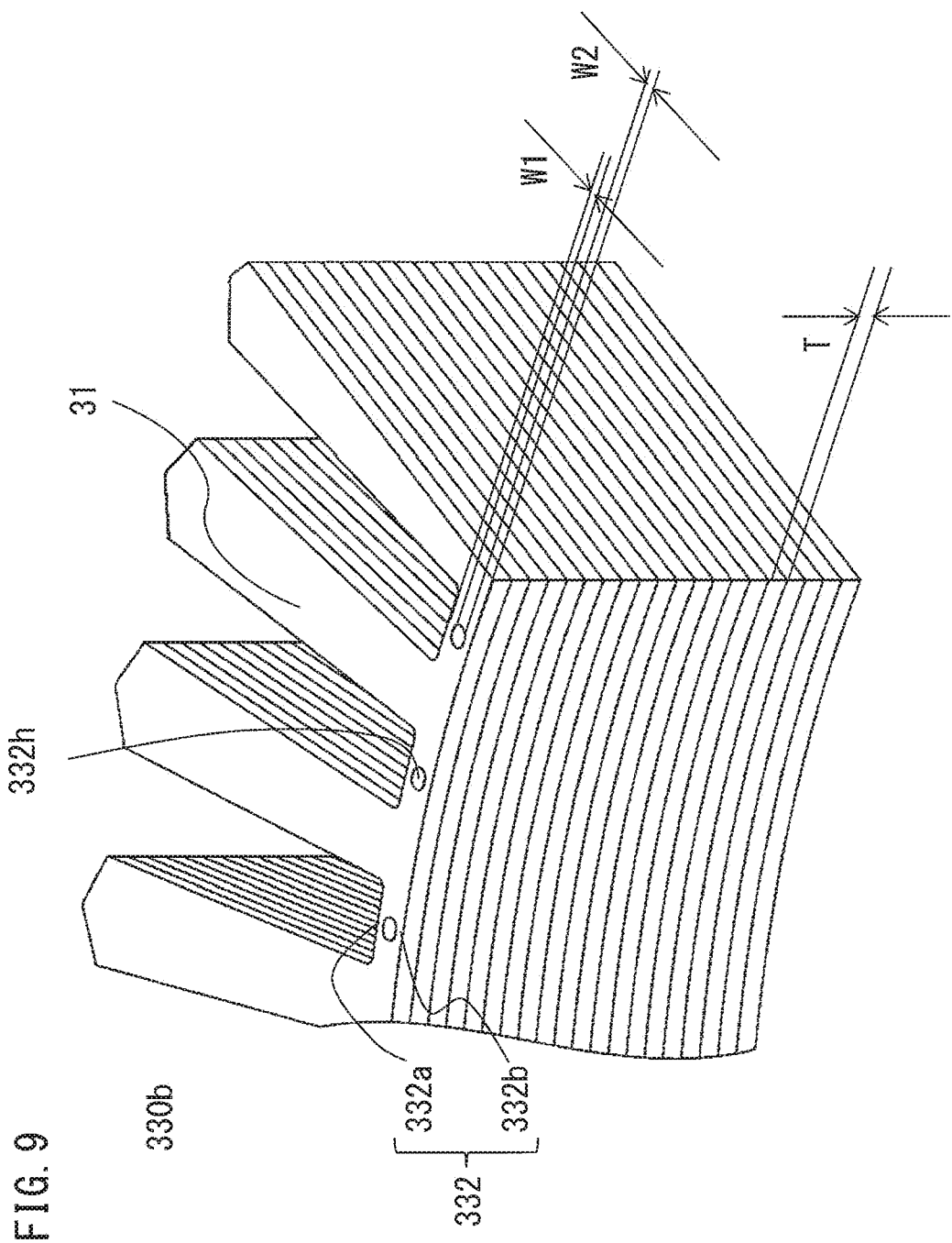
FIG. 9 is an enlarged perspective view of a main part of an inner core according to Embodiment 3 of the present invention.

FIG. 9 is an enlarged perspective view of a main part of an inner core 330b.

Similar to Embodiment 1, the respective teeth 31 are connected at the inner side end portions thereof to the teeth 31 adjacent thereto in the circumferential direction by connection portions 332. Here, the width W1 in the radial direction of an outer side connection portion 332a and the width W2 in the radial direction of an inner side connection portion 332b are equal to or greater than ¼ and less than ½ of the sheet thickness T of each sheet forming a stator core.

As for the sheets that are electromagnetic steel sheets or steel sheets, sheets obtained by press working are used. The inner side surface and the outer side surface of the narrowest portion of the connection portion 332 are also worked by press, and each side surface has both a shear surface and a fracture surface.

Meanwhile, when a member having a small width with respect to the sheet thickness is worked in press working, this portion easily deforms in the off-plane direction during the working, and thus the shape accuracy after the working decreases. The width with which working can be performed such that influence of deformation can be neglected is at least about ¼ of the sheet thickness T.

Therefore, in the present embodiment, by setting the widths in the radial direction of the outer side connection portion 332a and the inner side connection portion 332b of the connection portion 332 to be equal to or greater than ¼ of the sheet thickness T of each sheet forming the core, a decrease in shape accuracy due to deformation of this portion during press working is prevented.

Meanwhile, great force is required for press working of the sheet. Thus, a great load is applied to the vicinity of the worked portion during press working, and residual stress is generated in the vicinity of the worked portion even after the press working. That is, in the stator core formed by press working, the range in which the residual stress generated associated with the working is influenced is distributed along the press-worked portion of the stator core. The range that can be considered to be influenced by the residual stress is a range of about ½ of the sheet thickness from the worked surface. In particular, in a range of about ¼ of the sheet thickness, stress significantly remains, including deformation in the sheet thickness direction of the sheet.

For the electromagnetic steel sheets or steel sheets forming the stator core, a material having a high magnetic permeability is used. When residual stress is generated, the magnetic permeability of each steel sheet, which is a magnetic material, decreases. Thus, the magnetic resistance per unit cross-sectional area is high as compared to a portion in which residual stress is not generated.

In the present embodiment, the width in the radial direction of the narrowest portion (the outer side connection portions 332a and 332b) of the connection portion 332 is set to be less than ½ of the sheet thickness T, a range of ¼ of the sheet thickness that is a range in which residual stress due to press working of both side surfaces of the connection portion 332 is high is present over the entireties of the inner side edge and the outer side edge of the outer side connection portion 332a and the inner side connection portion 332b. Therefore, a state where the magnetic resistance per unit area is increased can be obtained in the entireties of cross-sections of the outer side connection portion 332a and the inner side connection portion 332b.

In the stator for a rotary electric machine and the rotary electric machine according to Embodiment 3 of the present invention, the advantageous effects achieved in Embodiment 1 are achieved. In addition, by increasing residual stress in the outer side connection portion 332a and the inner side connection portion 332b, a magnetic flux flowing between the adjacent teeth 31 via the connection portion 332 can be further reduced, and thus a stator for a rotary electric machine and a rotary electric machine that have high efficiency can be provided.

Embodiment 4

Hereinafter, a stator for a rotary electric machine and a rotary electric machine according to Embodiment 4 of the present invention will be described with reference to the drawings, focusing on the differences from Embodiment 3.

Figure 10:
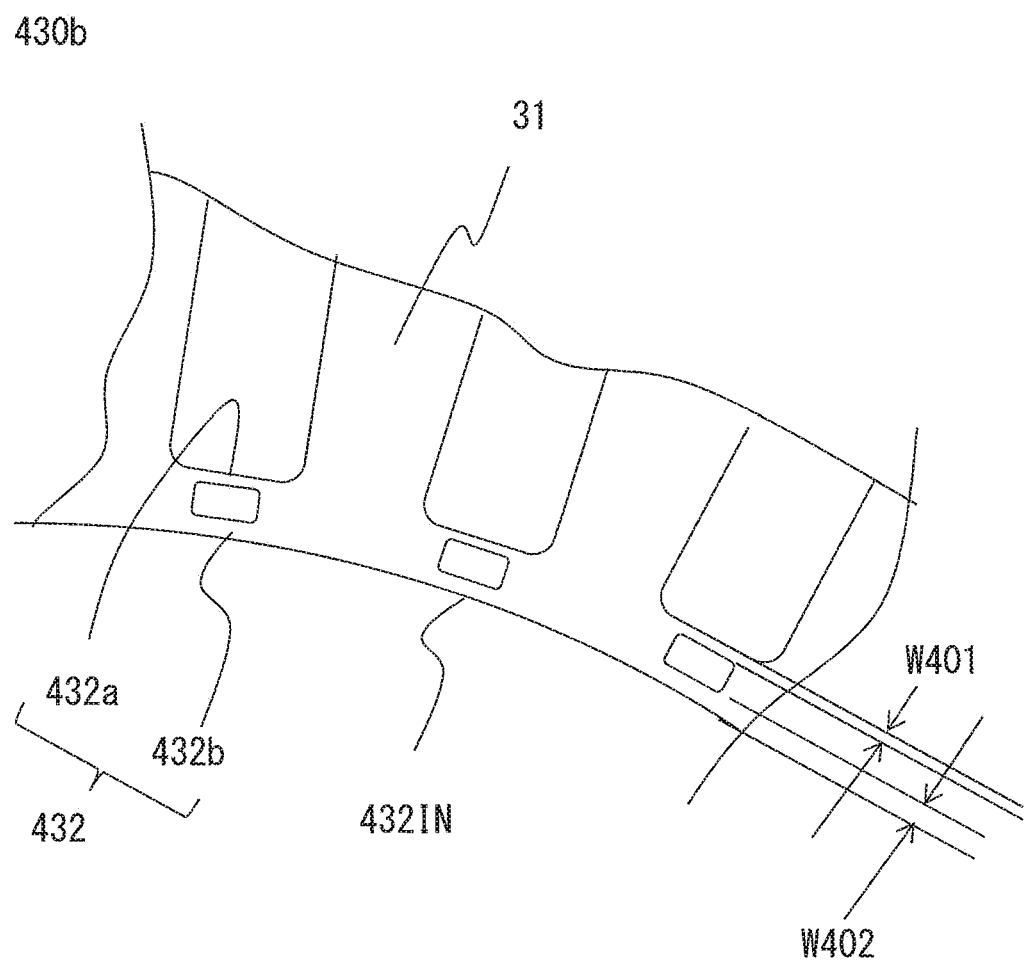
FIG. 10 is an enlarged front view of a main part of an inner core according to Embodiment 4 of the present invention.

FIG. 10 is an enlarged front view of a main part of an inner core 430b.

The difference between the inner core 430b according to Embodiment 4 and the inner core 330b described in Embodiment 3 is that the width W402 in the radial direction of an inner side connection portion 432b at the inner side of each hole 332h is larger than the width W401 in the radial direction of an outer side connection portion 432a at the outer side.

In Embodiment 3, in consideration of deformation of the connection portion during press working, the widths in the radial direction of the outer side connection portion 332a and the inner side connection portion 332b are limited to be equal to or greater than ¼ of the sheet thickness, but deformation of the press-worked portion cannot be fully eliminated. The state of deformation of the press-worked portion changes depending on wear of a mold, variations in the sheet thickness of the material, and the like, and thus it is necessary to more strictly manage these elements as the width of the connection portion becomes smaller. On the other hand, when the management states of these elements are similar, deformation is considered to more easily occur when the width of the connection portion is smaller.

FIG. 11 is an enlarged perspective view of the vicinity of the connection portion 332 of the sheets used in Embodiment 3 and shows a cross-section of the connection portion 332 taken along a plane parallel to the axial direction. Here, elements such as a fracture surface and a shear surface in a press-worked surface are neglected, and the cross-section is represented in a rectangular shape.

Figure 11A:
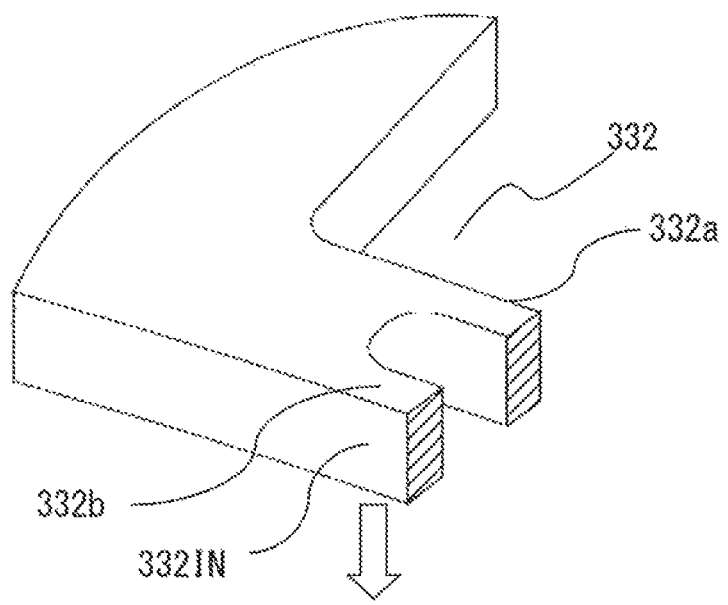
FIG. 11A is an enlarged perspective view of the vicinity of a connection portion of sheets used in Embodiment 3 of the present invention.

FIG. 11A represents a state where no deformation has occurred in the connection portion 332. When the connection portion 332 is worked by press, shearing force is applied in the direction of an arrow in the drawing. When no deformation has occurred in the connection portion 332, an inner peripheral surface 332IN of the sheets are perpendicular to a plane perpendicular to the axial direction of the sheets.

Figure 11B:
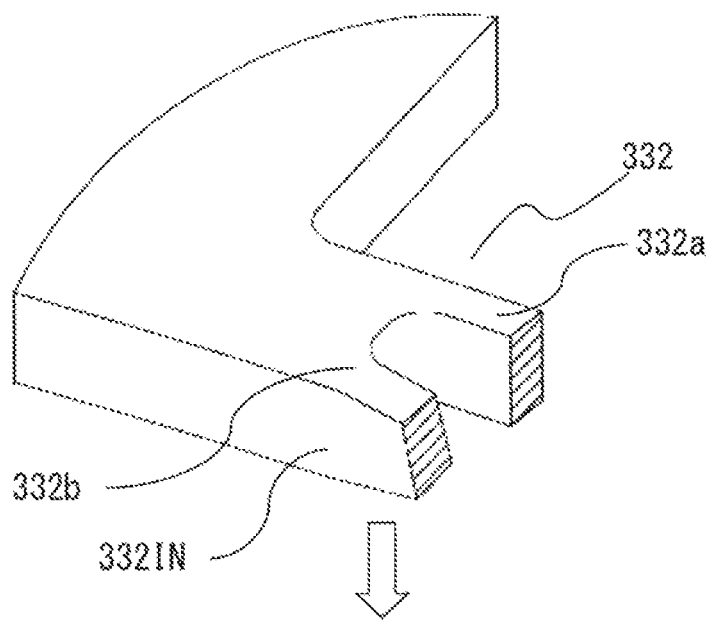
FIG. 11B is an enlarged perspective view of the vicinity of a connection portion of sheets used in Embodiment 3 of the present invention.

Meanwhile, FIG. 11B schematically represents a state where deformation has occurred in the connection portion 332. Since the shearing force is applied in the direction of the arrow in the drawing, torsion occurs in the outer side connection portion 332a and the inner side connection portion 332b of the connection portion 332, and a portion of the inner peripheral surface 332IN of the connection portion 332 is shifted from the proper position. In press working, by holding the sheets between molds from the up-down direction, the sheets are prevented from being deformed by the shearing force as shown in FIG. 11B. However, when the width in the radial direction of the connection portion 332 is small, the retention force of the sheets decreases, and thus deformation easily occurs here.

Even if deformation occurs in the sheets, the cross-sectional area of the connection portion 332 itself does not change, and thus the effect of reducing a leakage magnetic flux due to the decreased width of the connection portion 332 is achieved. However, since torsion occurs in the outer side connection portion 332a and the inner side connection portion 332b, the positions in the radial direction of both the inner side surface and the outer side surface of the connection portion 332 are slightly shifted from the positions at which these side surfaces should be located.

Meanwhile, of the connection portion split into a plurality of sections in the radial direction, the inner side connection portion 332b at the innermost peripheral side opposes the rotor 4 with an air gap therebetween. When the position of the inner peripheral surface 332IN of the inner core is shifted, due to deformation of the inner side connection portion 332b, from the position at which the inner peripheral surface 332IN should be located, the interval between the stator 3 and the rotor 4 changes, so that influence, such as occurrence of rotation unevenness of the rotary electric machine 100, occurs. On the other hand, the outer side connection portion 332a other than the inner side connection portion 332b at the innermost peripheral side does not oppose the rotor 4, and thus deformation thereof does not change the characteristics of the rotary electric machine 100. Therefore, in the present embodiment, as described above, by making the width W402 of the inner side connection portion 432b at the innermost peripheral side larger than the width W401 of the outer side connection portion 432a other than the inner side connection portion 432b, deformation of the connection portion 432, particularly, deformation of the inner peripheral surface 432IN of the connection portion 432, during press working is prevented.

In the stator for a rotary electric machine and the rotary electric machine according to Embodiment 4 of the present invention, the advantageous effects achieved in Embodiment 3 are achieved. In addition, since the width W402 of the connection portion at the innermost peripheral side is made larger than the width W401 of the other connection portion, deformation is prevented from occurring in the connection portion 432 during press working, and an adverse effect of deformation on the rotation characteristics of the rotary electric machine can be reduced.

It is noted that, within the scope of the present invention, the above embodiments may be freely combined with each other, or each of the above embodiments may be modified or simplified as appropriate.

The invention claimed is:
1. A stator for a rotary electric machine, the stator comprising: a stator core formed by stacking magnetic sheets; and a stator winding wound on teeth of the stator core, wherein
   the stator core includes
      an outer core that is an annular back yoke portion, and
      an inner core in which a plurality of the teeth are radially arranged and inner side end portions of the teeth adjacent to each other in a circumferential direction are connected to each other in the circumferential direction by connection portions and which is fitted to an inner side of the outer core,
   each connection portion has a hole penetrating in an axial direction,
   each connection portion is split in a radial direction into a plurality of sections by the hole, and
   a width in the radial direction of one connection portion at a portion of the connection portion that has a smallest width in the radial direction is equal to or greater than ¼ and less than ½ of a Sheet Thickness of Each of the Sheets.

2. The stator for a rotary electric machine according to claim 1, wherein, of the connection portion split into a plurality of sections, a width in the radial direction of a connection portion at an innermost peripheral side is larger than a width in the radial direction of a connection portion other than the connection portion at the innermost peripheral side.

3. The stator for a rotary electric machine according to claim 1, wherein
the connection portions are provided in the sheets forming some of stacked layers of the inner core, and
the connection portions are not provided in the sheets forming the stacked layers other than the sheets forming said some of stacked layers of the inner core.

4. A rotary electric machine comprising:
the stator for a rotary electric machine according to claim 1; and
a rotor rotatably held so as to oppose an inner peripheral surface of the stator.

5. The stator for a rotary electric machine according to claim 2, wherein
the connection portions are provided in the sheets forming some of stacked layers of the inner core, and
the connection portions are not provided in the sheets forming the stacked layers other than the sheets forming said some of stacked layers of the inner core.

6. A rotary electric machine comprising:
the stator for a rotary electric machine according to claim 2; and
a rotor rotatably held so as to oppose an inner peripheral surface of the stator.

7. A rotary electric machine comprising:
the stator for a rotary electric machine according to claim 3; and
a rotor rotatably held so as to oppose an inner peripheral surface of the stator.

8. A rotary electric machine comprising:
the stator for a rotary electric machine according to claim 5; and
a rotor rotatably held so as to oppose an inner peripheral surface of the stator.

9. The stator for a rotary electric machine according to claim 1, wherein
the hole splits the connection portion into an outer side connection portion and an inner side connection portion.

* * * * *